United States Patent
Ogawa et al.

(10) Patent No.: US 10,536,101 B2
(45) Date of Patent: Jan. 14, 2020

(54) CONTROL DEVICE FOR ALTERNATING CURRENT MOTOR

(71) Applicant: DENSO CORPORATION, Kariya, Aichi-pref. (JP)

(72) Inventors: Takashi Ogawa, Kariya (JP); Masaki Nishiyama, Kariya (JP); Mitsuharu Matsuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/254,307

(22) Filed: Jan. 22, 2019

(65) Prior Publication Data

US 2019/0229663 A1 Jul. 25, 2019

(30) Foreign Application Priority Data

Jan. 23, 2018 (JP) .................. 2018-008953

(51) Int. Cl.
*H02P 3/00* (2006.01)
*H02P 21/14* (2016.01)
*H02P 21/24* (2016.01)

(52) U.S. Cl.
CPC ............ *H02P 21/141* (2013.01); *H02P 21/24* (2016.02)

(58) Field of Classification Search
CPC ................................ H02P 21/141; H02P 21/24
USPC ........................................................ 318/490
See application file for complete search history.

(56) References Cited

U.S. PATENT DOCUMENTS

| | | | |
|---|---|---|---|
| 9,059,653 B2 * | 6/2015 | Shimada | H02P 6/183 |
| 2006/0119312 A1 | 6/2006 | Okamura et al. | |
| 2015/0137720 A1 * | 5/2015 | Kobayashi | H02P 21/141 318/400.15 |
| 2015/0372627 A1 * | 12/2015 | Kim | H02P 21/141 318/801 |
| 2017/0155349 A1 * | 6/2017 | Kim | H02P 6/28 |
| 2019/0229661 A1 | 7/2019 | Ogawa et al. | |
| 2019/0229664 A1 | 7/2019 | Kobayashi | |
| 2019/0229665 A1 | 7/2019 | Kobayashi | |

* cited by examiner

*Primary Examiner* — Bickey Dhakal
*Assistant Examiner* — Gabriel Agared
(74) *Attorney, Agent, or Firm* — Oliff PLC (57) ABSTRACT

In a MG control device, a standard voltage calculation part calculates a d-axis standard voltage Vd_std and a q-axis standard voltage Vq_std to be supplied to a MG. A first magnetic flux change amount estimation value calculation part calculates a first magnetic flux change amount estimation value Δφ1 based on a deviation of a specific value from the q axis standard voltage Vq_std, where the specific value is obtained by multiplying a ratio (Vd_std/Vd_real) with a q-axis real voltage Vq_real, where Vd_real represents a d-axis real voltage. A second magnetic flux change amount estimation value calculation part calculates a second magnetic flux change amount estimation value Δφ2 based on a deviation of the q-axis real voltage Vq_real from the q-axis standard voltage Vq_std. The calculation switching part selects one of Δφ1 and Δφ2 based on an operation state of the MG.

4 Claims, 8 Drawing Sheets

CONTROL DEVICE FOR ALTERNATING CURRENT MOTOR

CROSS-REFERENCE TO RELATED APPLICATION

This application is related to and claims priority from Japanese Patent Application No. 2018-8953 filed on Jan. 23, 2018, the contents of which are hereby incorporated by reference.

TECHNICAL FIELD

The present disclosure relates to control devices performing power supply control to supply alternating current power to alternating current motors.

BACKGROUND

There are known control devices for alternating current motors (AC motors) configured to detect occurrence of demagnetization in a permanent magnet type motor by detecting reduction of an output torque thereof caused by irreversible demagnetization within a high temperature range. It is difficult for those control devices to correctly detect the occurrence of demagnetization in a permanent magnet type motor with high accuracy.

SUMMARY

The present disclosure provides the following devices. A control device for alternating current motors as an aspect of the present disclosure performing a power supply control of an alternating current motor having permanent magnets. The control device has a magnetic flux change amount estimation part estimating a magnetic flux change amount. The magnetic flux change amount estimation part has a calculation switching part selects, as the magnetic flux change amount, one of a first magnetic flux change amount estimation value and a second magnetic flux change amount estimation value on the basis of an operation state of the alternating current motor.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Hereinafter, various embodiments of the present disclosure will be described with reference to the accompanying drawings. In the following description of the various embodiments, like reference characters or numerals designate like or equivalent component parts throughout the several diagrams.

Exemplary Embodiment

A description will be given of a control device for alternating current motors (AC motors) as a motor generator (MG) control device 20 according to an exemplary embodiment of the present disclosure with reference to FIG. 1 to FIG. 8.

Figure 1:
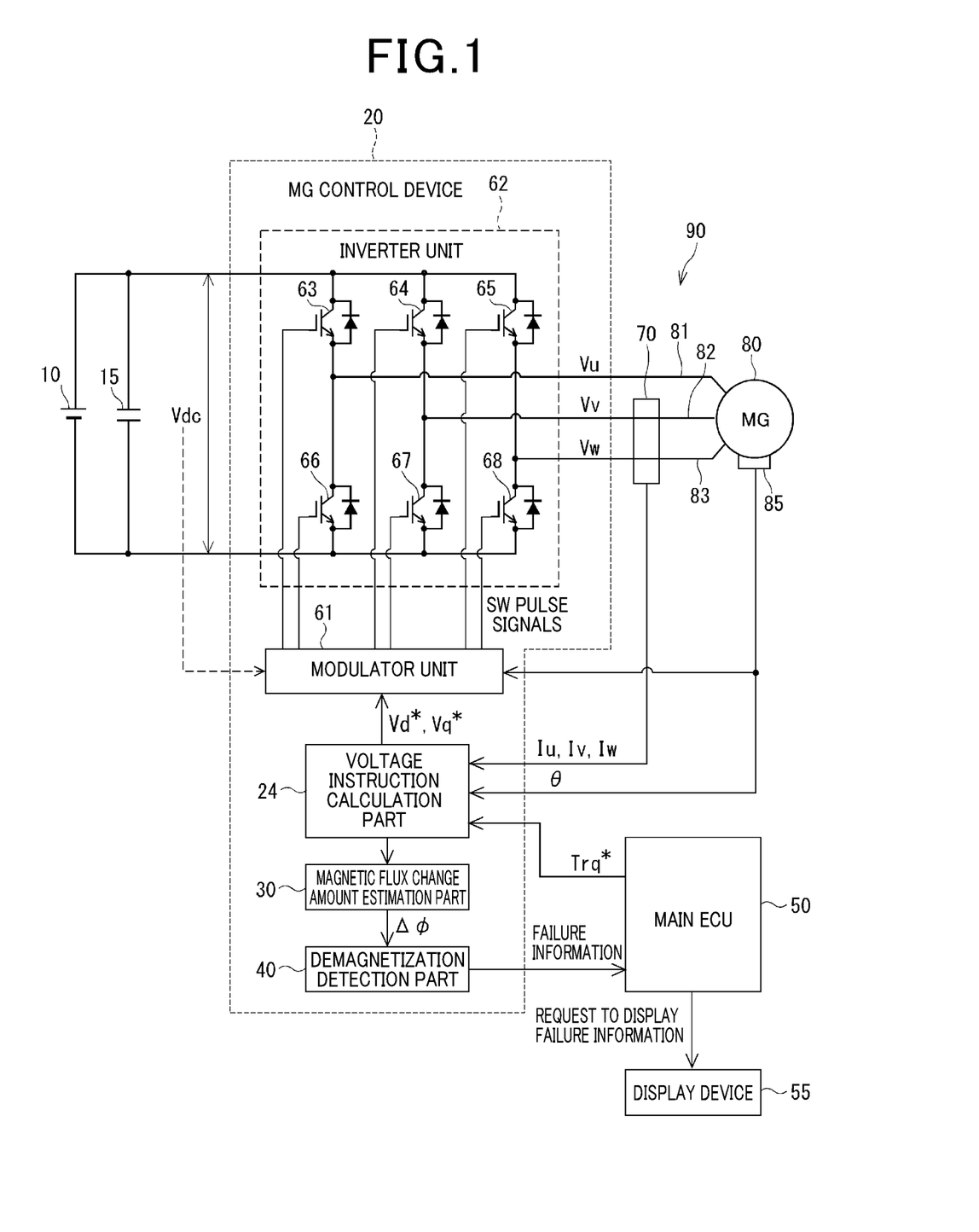
FIG. 1 is a view showing an overall structure of a motor generator drive system equipped with a motor generator control device according to an exemplary embodiment of the present disclosure.

FIG. 1 is a view showing an overall structure of the MG drive system 90 equipped with the MG control device 20 as the control device for AC motors according to the exemplary embodiment. As shown in FIG. 1, the MG drive system 90 is equipped with the MG control device 20 as the control device for AC motors. The MG control device 20 is configured to perform power supply control to supply alternating current power (AC power) to alternating current motors (AC motors). The MG drive system 90 drives the motor generator (MG) 80 mounted on a motor vehicle such as a hybrid vehicle and may act as an electric motor. The MG 80 is a permanent magnet type MG. The MG 80 is used as a main driving power source of the motor vehicle. The MG control device 20 performs an electric power supply to supply electric power to the MG 80.

A description will be given of an overall structure of the MG drive system 90 with reference to FIG. 1. As shown in FIG. 1, the MG control device 20 has a voltage instruction calculation part 24, a magnetic flux change amount estimation part 30, a demagnetization detection part 40, a modulator unit 61, an inverter unit 62 as an electric power conversion unit, etc. The MG 80 is a permanent magnet synchronous three phase AC motor. For example, the MG 80 corresponds to an interior permanent magnet synchronous motor (IPMSM) or a surface permanent magnet synchronous motor (SPMSM). In the exemplary embodiment, the MG 80 has a first function and a second function. The first function of the MG 80 provides an electric motor capable of generating an output torque to be used for driving wheels of a hybrid vehicle. The second function of the MG 80 provides an alternator to be driven by a torque transmitted from an internal combustion engine and the wheels of the hybrid vehicle. The alternator generates an electric power using the received torque transmitted from the internal combustion engine and the wheels.

The current sensor 70 detects two or three of phase currents Iu, Iv, Iw which flow in two phase windings or three phase windings 81, 82 and 83 of the MG 80. When the current sensor 70 detects two phase currents, the remaining phase current is calculated on the basis of the Kirchhoff's circuit laws. A rotation angle sensor 85 is a resolver capable of detecting an electrical angle θ of the MG 80.

The inverter 62 acts as an electric power converter comprising upper arm and a lower arm. In the inverter 62, the upper arm has three switching elements 63, 64 and 65, and the lower arm has three switching elements 66, 67 and 68. The switching elements switching elements 63 to 68 are connected together in a bridge form. In more detail, the switching elements 63, 64 and 65 correspond to the respective the U phase upper arm, the V phase upper arm and the W phase upper arm. The switching elements 66, 67 and 68 correspond to the respective the U phase lower arm, the V phase lower arm and the W phase lower arm. For example, the switching elements 63, 64 and 65 are composed of Insulated Bipolar Transistors (IGBTs). A flyback diode (or a freewheeling diode) is connected in parallel to each of the switching elements 63, 64 and 65. It is acceptable to use the IGBTs and the respective flyback diodes in a power-card configuration.

A smoothing capacitor 15 is arranged at an input side of the inverter 62, and smooths a direct current voltage Vdc (DC voltage Vdc) supplied from a battery 10. It is acceptable to arrange a booster converter between the battery 10 and the inverter 62. The inverter 62 receives switching pulse signals (SW pulse signals shown in FIG. 1) transmitted from the MG control device 20. The switching elements 63 to 66 in the inverter 62 are turned on/odd on the basis of the received SW pulse signals so as to convert a direct current power (DC power) to a three phase alternating current power (three phase AC power). The inverter 62 supplies three phase voltages Vu, Vv, Vw of the converted three phase AC power to the respective three phase windings 81, 82 and 83 of the MG 80.

In general, a computer system is composed of a microcomputer composed of a central processing unit (CPU), a read only memory (ROM), a random access memory (RAM), an input/output port (I/O port), bus lines, etc. The CPU, the ROM, the RAM, the I/O port are connected together through the bus lines. The microcomputer provides functioning of the voltage instruction calculation part 24, the modulator unit 61, etc. in the MG control device 20. In the microcomputer, the CPU executes programs which have been stored in a memory device (i.e. a non-transitory computer readable storage medium for storing programs), for example, the ROM so as to provide the functioning of the modulator unit 61, the MG control device 20, etc. It is acceptable to use hardware units composed of dedicated electronic circuits so as to provide the functioning of the modulator unit 61, the MG control device 20, etc.

The voltage instruction calculation part 24 calculates voltage instruction values Vd*, Vq* on the basis of a torque instruction Trq* transmitted from a main electronic control unit 50 (main ECU 50), three phase currents Iu, Iv, Iw which are provided by feedback from the current sensor 70 and the rotation angle sensor 85 and information about the electrical angle θ of the MG 80. The voltage instruction calculation part 24 supplies the calculated voltage instruction values Vd*, Vq* to the MG 80.

The modulator unit 61 generates a switching pulse signal on the basis of the DC voltage Vdc, the voltage instruction values Vd*, Vq*, the electrical angle θ, etc. The modulator unit 61 transmits the generated switching pulse signal to the switching elements 63 to 68 in the inverter 62.

The magnetic flux change amount estimation part 30 calculates an estimation value Δφ of a magnetic flux change amount (hereinafter, referred to as the magnetic flux change amount estimation value Δφ) of permanent magnets in the magnetic flux change amount estimation part 30. A detailed structure and functioning of the magnetic flux change amount estimation part 30 will be explained later.

The demagnetization detection part 40 determines that the permanent magnets in the MG 80 are demagnetized when the magnetic flux change amount estimation value Δφ calculated by the magnetic flux change amount estimation part 30 is lower than a predetermined detection threshold value.

When detecting the occurrence of demagnetization of the permanent magnets in the MG 80, the demagnetization detection part 40 generates and transmits failure information of the main ECU 50 in the motor vehicle. The main ECU 50 which has received the failure information transmitted from the demagnetization detection part 40 instructs a meter electric control unit (meter ECU) 50 so as for a display device 55 mounted on the motor vehicle so as to display the failure information. Input parameters to be transmitted to magnetic flux change amount estimation part 30 and the demagnetization detection part 40 are omitted from FIG. 1.

A description will be given of the structure of the MG control device 20 with reference to FIG. 2.

Figure 2:
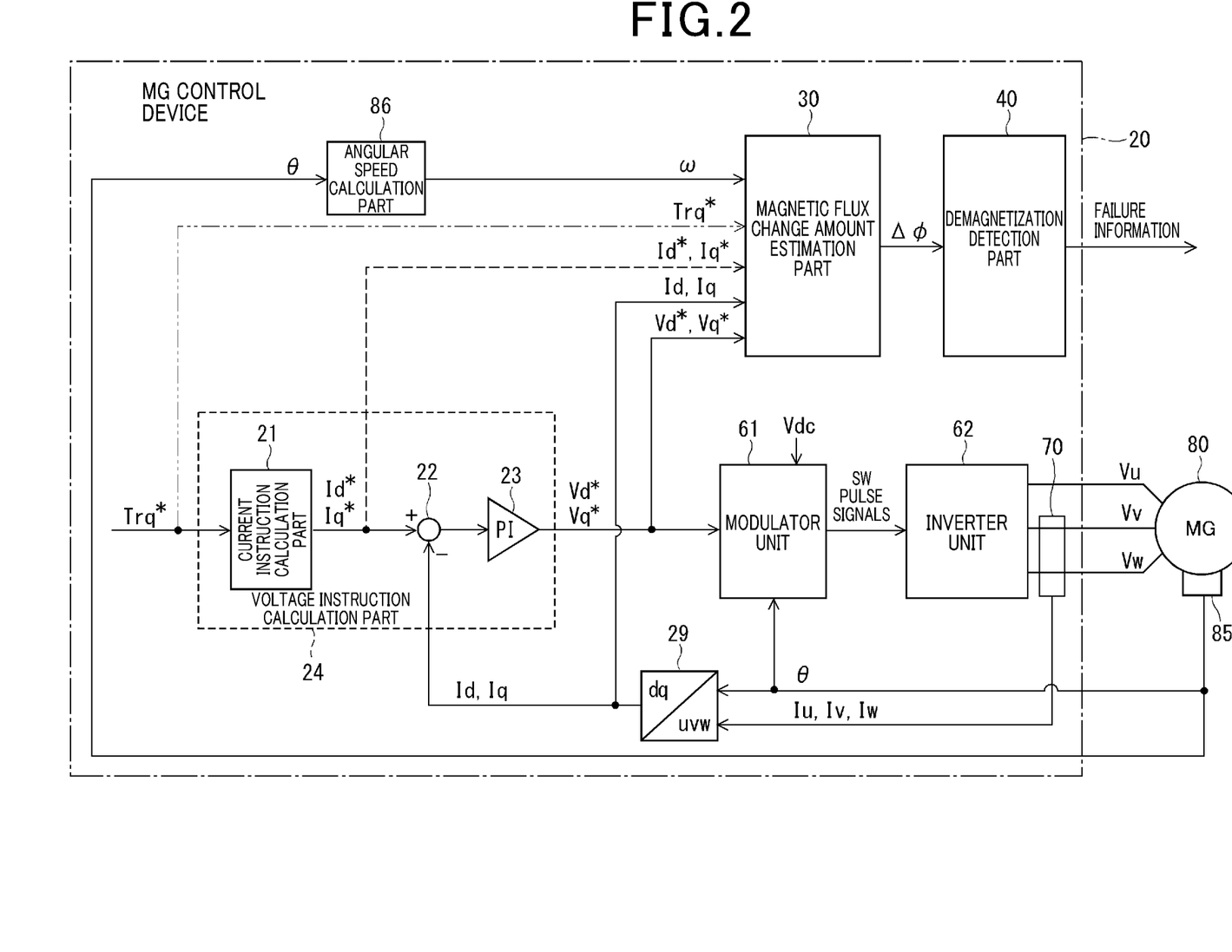
FIG. 2 is a block diagram showing a detailed structure of the MG control device according to the exemplary embodiment of the present disclosure shown in FIG. 1.

FIG. 2 is a block diagram showing a detailed structure of the MG control device 20 according to the exemplary embodiment of the present disclosure shown in FIG. 1. FIG. 2 shows an example of the structure configured to calculate the voltage instruction values on the basis of the current feedback control. It is acceptable to calculate the voltage instruction values on the basis of a torque feedback control.

The MG control device 20 has the magnetic flux change amount estimation part 30 as a specific component of the MG control device according to the exemplary embodiment. The vector control using d-q coordinates of a rotary coordinate system is a known technique. The voltage and current to be used in the control calculation performed by the MG control device 20 correspond to a d-q axis voltage and a d-q axis current.

The voltage instruction calculation part 24 has a current instruction calculation part 21, a current deviation calculation part 22 and a control unit 23. The current instruction calculation part 21 calculates the current instruction values Id*, Iq* on the basis of the torque instruction Trq*.

The current deviation calculation part 22 calculates a current deviation of the d and q axis current detection values Id and Iq from the current instruction values Id*, Iq*, where the current detection values Id, Iq have been provided by feedback from a d-q conversion part 29. The control unit 23 performs a proportional integral (IP) control so as to calculate voltage instruction values Vd*, Vq* so that the current deviation calculated by the current deviation calculation part 22 approaches to zero.

The d-q conversion part 29 converts the three phase current values Iu, Iv, Iw to a d axis current value Id and a q axis current value Iq on the basis of the electrical angle θ. The d-q conversion part 29 transmits the obtained d and q axis current values Id and Iq to the current deviation calculation part 22. That is, the d-q conversion part 29 performs the feedback of the obtained d and q axis current values Id and Iq to the current deviation calculation part 22.

The modulator unit 61 generates the switching pulse signals on the basis of the DC voltage Vdc, the voltage instruction values Vd*, Vq* and the electrical angle θ, etc. The inverter unit 62 transmits the generated switching pulse signals to the inverter unit The modulator unit 61 switches the three phase modulation or the two phase modulation of the PWM control, a pulse pattern method, and a rectangle wave control method, etc. on the basis of the modulation rate and the rotation speed torque characteristics of the MG 80.

The switching elements 63 to 68 in the inverter unit 62 are turned on/off on the basis of the received switching pulse signals transmitted from the modulator unit 61 so as to convert the DC power of the battery 10 to the AC power, and supply the converted AC power to the MG 80.

A standard magnetic flux amount is determined when the permanent magnets of the MG 80 are not demagnetized.

The magnetic flux change amount estimation part 30 calculates the magnetic flux change amount estimation value Δϕ which is a deviation of a real magnetic flux amount from the standard magnetic flux amount. Because the real magnetic flux amount becomes smaller than the standard magnetic flux amount when the permanent magnets in the MG 80 are demagnetized, the magnetic flux change amount estimation value Δϕ becomes a negative value.

The demagnetization detection part 40 determines that demagnetization of the permanent magnets has occurred when the magnetic flux change amount estimation value Δϕ calculated by the magnetic flux change amount estimation part 30 becomes smaller than the predetermined detection threshold value Δϕ_diag.

As shown in FIG. 2, the magnetic flux change amount estimation part 30 receives various parameters. As shown with the solid lines in FIG. 2, the magnetic flux change amount estimation part 30 receives the voltage instruction values Vd*, Vq*, the d and q axis current values Id and Iq and an electrical angular speed ω. An angular speed calculation part 86 performs a differential calculation of the electrical angle θ to obtain the electrical angular speed ω.

It is acceptable for the magnetic flux change amount estimation part 30 to receive the current instruction values Id*, Iq* transmitted from the current instruction calculation part 21, as designated by the dotted lines shown in FIG. 2.

Because a rotation speed [rpm] of the MG 80 is calculated by multiplying the electrical angular speed ω [rad/s] by a coefficient, the rotation speed of the MG 80 is designated with reference character ω, i.e. the rotation speed [ω]. It is possible to use the electrical angular speed [ω] instead of using the rotation speed [ω].

A description will now be given of the magnetic flux change amount estimation calculation on the basis of the Vq method. The structure of the magnetic flux change amount estimation part 30 in the MG control device according to the exemplary embodiment will be explained later.

It is possible to explain the relationship between the voltage and the current to be supplied to the MG 80 by using the following equation (1). Equation (1) uses a winding resistance R, d-q axis inductances Ld, Lq and a magnetic flux ϕ.

$$\left. \begin{array}{l} Vd = -\omega \times Lq \times Iq + R \times Id \\ Vq = \omega \times Ld \times Id + R \times Iq + \omega \times \phi \end{array} \right\} \quad (1)$$

It is possible to replace Equation (1) with Equation (2) on the basis of the magnetic flux ϕ.

$$\phi = \frac{Vq - \omega \times Ld \times Id - R \times Iq}{\omega} \quad (2)$$

When ϕstd represents the standard magnetic flux amount and ϕreal represents the real magnetic flux amount of the permanent magnets in the MG 80.

A standard voltage is determined when the permanent magnets of the MG 80 are in a standard state in which no magnetization has occurred in the permanent magnets, i.e. when the MG 80 generates the standard magnetic flux ϕstd. The standard voltage is composed of a d axis standard voltage Vd_std and a q axis standard voltage Vq_std.

On the other hand, a real voltage is supplied to the MG 80 during the operation state thereof. The real voltage is composed of a d axis real voltage Vd_real and a q axis real voltage Vq_real.

When the q axis standard voltage Vq_std and the q axis real voltage Vq_real are used, Equation (1) is converted to Equations (3.1) and (3.2).

$$Vq\_std = \omega \times Ld \times Id + R \times Iq + \omega \times \phi std \quad (3.1)$$

$$Vq\_real = \omega \times Ld \times Id + R \times Iq + \omega \times \phi real \quad (3.2)$$

The magnetic flux change amount estimation part 30 calculates the magnetic flux change amount estimation value calculated by using the Vq method which will be referred to as a second magnetic flux change amount estimation value Δϕ2. The second magnetic flux change amount estimation value Δϕ2 can be expressed by Equation (4) on the basis of Equations (3.1) and (3.2).

A deviation of the q axis real voltage Vq_real from the q axis standard voltage Vq_std in Equation (4) is used as a second q axis voltage change amount ΔVq2.

$$\Delta \phi 2 = \phi \text{real} - \phi \text{std} = \frac{Vq\_real - Vq\_std}{\omega} = \frac{\Delta Vq2}{\omega} \quad (4)$$

Figure 3:
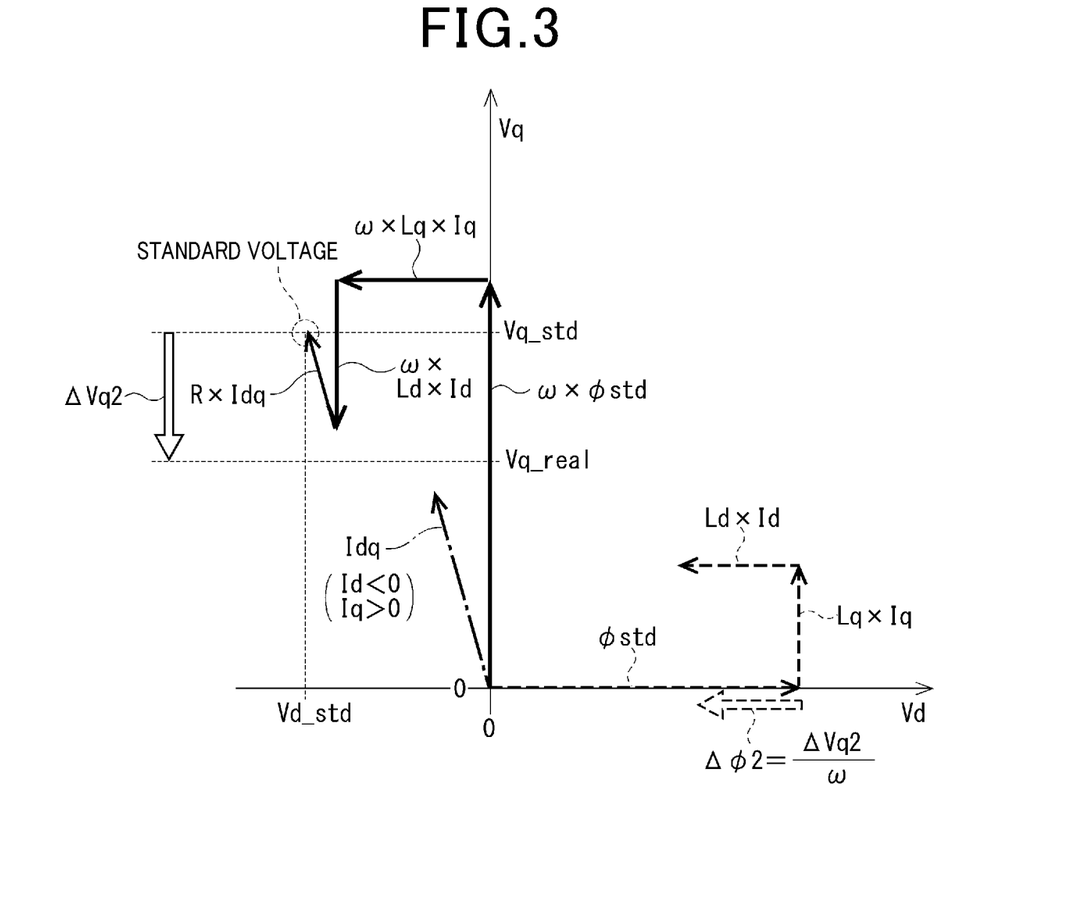
FIG. 3 is a view explaining an estimation operation of estimating a magnetic flux change amount in a motor generator.

FIG. 3 is a view explaining an estimation operation of estimating the magnetic flux change amount in the MG 80. As shown in FIG. 3, the relationship between Equation (3.1) and Equation (4) is shown in the Vd-Vq coordinate system.

In FIG. 3, the solid arrow line represents the value obtained by Equation (3.1), and the q axis component at the front of the synthesized vector corresponds to the q axis standard voltage Vq_std.

In FIG. 3, the white thick solid arrow line represents the value obtained by Equation (4). The dotted arrow line represents the vectors in the voltage and time dimension before the multiplication of the electrical angular speed ω.

The estimation of the magnetic flux change amount based on the Vq method uses the q axis voltage only, and does not use the d axis voltage. Accordingly, the estimation of the magnetic flux change amount based on the Vq method is easily influenced by detection error of the voltage sensor, etc. It is therefore difficult to correctly detect whether the q axis voltage detected by the MG control device is changed due to demagnetization of the permanent magnets of the MG 80 or due to the sensor detection error. This causes estimation accuracy of the magnetic flux change amount to reduce, and reduces the demagnetization detection reliability.

In order to avoid this drawback and to reduce the estimation error, the magnetic flux change amount estimation part 30 in the MG control device 20 according to the exemplary embodiment as the control device for AC motors according to the present disclosure performs the magnetic flux change amount estimation calculation based on the Vd-Vq method which uses the d axis voltage in addition to the q axis voltage.

There is a possible case in which an operation state of the MG 80 causes that the estimation error of the magnetic flux change amount based on the Vd-Vq method to be greater than that based on the Vq method. As will be explained later in detail, the estimation error based on the Vd-Vq method increases more than the estimation error on the Vq method under a low output torque of the MG 80 where the d axis real voltage Vd_real is approximately zero.

The MG control device 20 according to the exemplary embodiment switches the Vd-Vq method and the Vq method on the basis of the operation state of the MG 80 so as to correctly estimate the magnetic flux change amount in the MG 80 with high accuracy, and to correctly detect the occurrence of demagnetization of the permanent magnets of the MG 80.

A description will be given of the structure of the magnetic flux change amount estimation part 30 with reference to FIG. 4.

Figure 4:
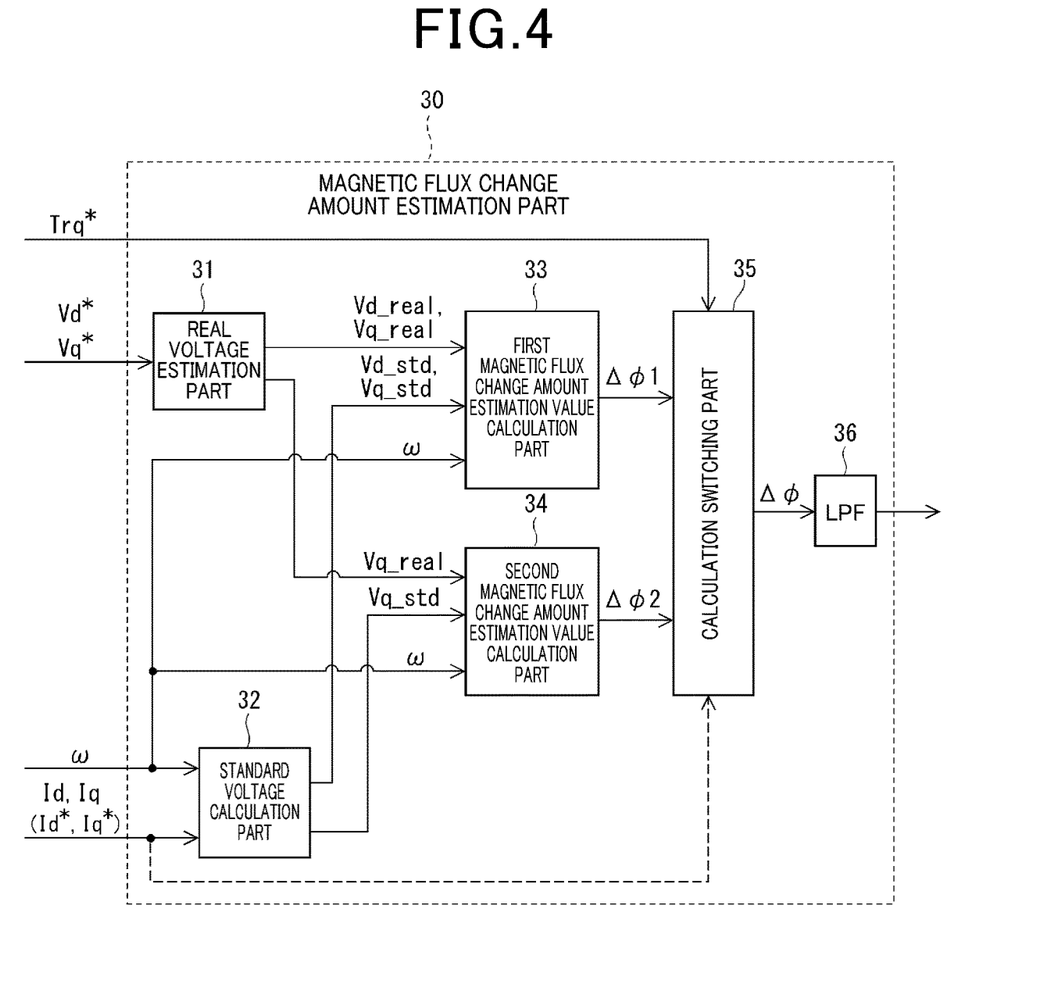
FIG. 4 is a block diagram showing a magnetic flux change amount estimation part in the MG control device according to the exemplary embodiment of the present disclosure shown in FIG. 1.

FIG. 4 is a block diagram showing the magnetic flux change amount estimation part 30 in the MG control device 20 according to the exemplary embodiment shown in FIG. 1. The magnetic flux change amount estimation part 30 has a real voltage estimation part 31, a standard voltage calculation part 32, a first magnetic flux change amount estimation value calculation part 33, a second magnetic flux change amount estimation value calculation part 34, a calculation switching part 35 and a low pass filter (LPF) 39.

The real voltage estimation part 31 estimates the d axis real voltage Vd_real and the q axis real voltage Vq_real, to be supplied to the MG 80, on the basis of the voltage instruction values Vd*, Vq*.

It is acceptable for the real voltage estimation part 31 to transmit corrected values of the voltage instruction values Vd*, Vq* as the d axis real voltage Vd_real and the q axis real voltage Vq_real.

It is acceptable for the real voltage estimation part 31 to directly receive the voltage detection values, transmitted from the voltage sensor, as the d and q axis current detection values Id and Iq.

The standard voltage calculation part 32 calculates the a d axis standard voltage Vd_std and the q axis standard voltage Vq_std on the basis of the electrical angular speed ω and the current detection values Id, Iq (or the current instruction values Id*, Iq*) of the MG 80 by using Equation (1).

It is not necessary to use a fixed value as those standard voltages Vd_std and Vq_std. It is acceptable to determine the d axis standard voltage Vd_std and the q axis standard voltage Vq_std on the basis of the winding resistance value, the inductance of the windings, and temperature characteristics of the permanent magnets of the MG 80. It is further acceptable for the standard voltage calculation part 32 to learn the voltage value varying based on the operation point and an ambient temperature when no irreversible demagnetization has occurred, and to determine the d axis standard voltage Vd_std and the q axis standard voltage Vq_std based on the learned voltage values. It is acceptable for the real voltage estimation part 31 to use Equation (5) which considers interlinked magnetic fluxes λq, λd instead of using Equation (1).

$$\left.\begin{array}{l}\text{Vd\_std} = -\omega \times \lambda q + R \times Id \\ \text{Vq\_std} = \omega \times \lambda d + R \times Iq\end{array}\right\} \quad (5)$$

The real voltage estimation part 31 transmits the estimated d axis real voltage Vd_real and the estimated q axis real voltage Vq_real to the first magnetic flux change amount estimation value calculation part 33. The standard voltage calculation part 32 transmits the calculated d axis standard voltage Vd_std and the calculated q axis standard voltage Vq_std to the first magnetic flux change amount estimation value calculation part 33.

Further, the real voltage estimation part 31 transmits the estimated q axis real voltage Vq_real to the second magnetic flux change amount estimation value calculation part 34. The standard voltage calculation part 32 transmits the calculated q axis standard voltage Vq_std to the second magnetic flux change amount estimation value calculation part 34.

The first magnetic flux change amount estimation value calculation part 33 calculates a first magnetic flux change amount estimation value Δϕ1 by using Equation (6) of the Vd-Vq method. The first magnetic flux change amount estimation value calculation part 33 calculates a deviation of a value from the q axis standard voltage Vq_std in Equation (6), where the value is obtained by multiplying the q axis real voltage Vq_real and a ratio of the d axis standard voltage Vd_std and the d axis real voltage Vd_real (Vd_std/Vd_real).

The first term in Equation (6) is used as the q axis real voltage correction value [Vq]. The deviation of the q axis real voltage correction value [Vq] from the q axis standard voltage Vq_std corresponds to a first q axis voltage change amount ΔVq1.

$$\Delta \phi 1 = \frac{\text{Vq\_real} \times \frac{\text{Vd\_std}}{\text{Vd\_real}} - \text{Vq\_std}}{\omega} = \frac{[Vq] - \text{Vq\_std}}{\omega} = \frac{\Delta Vq1}{\omega} \quad (6)$$

A description will now be given of a comparison of the magnetic flux change amount estimation performed by the Vd-Vq method and the Vq method with reference to FIG. 5.

Figure 5:
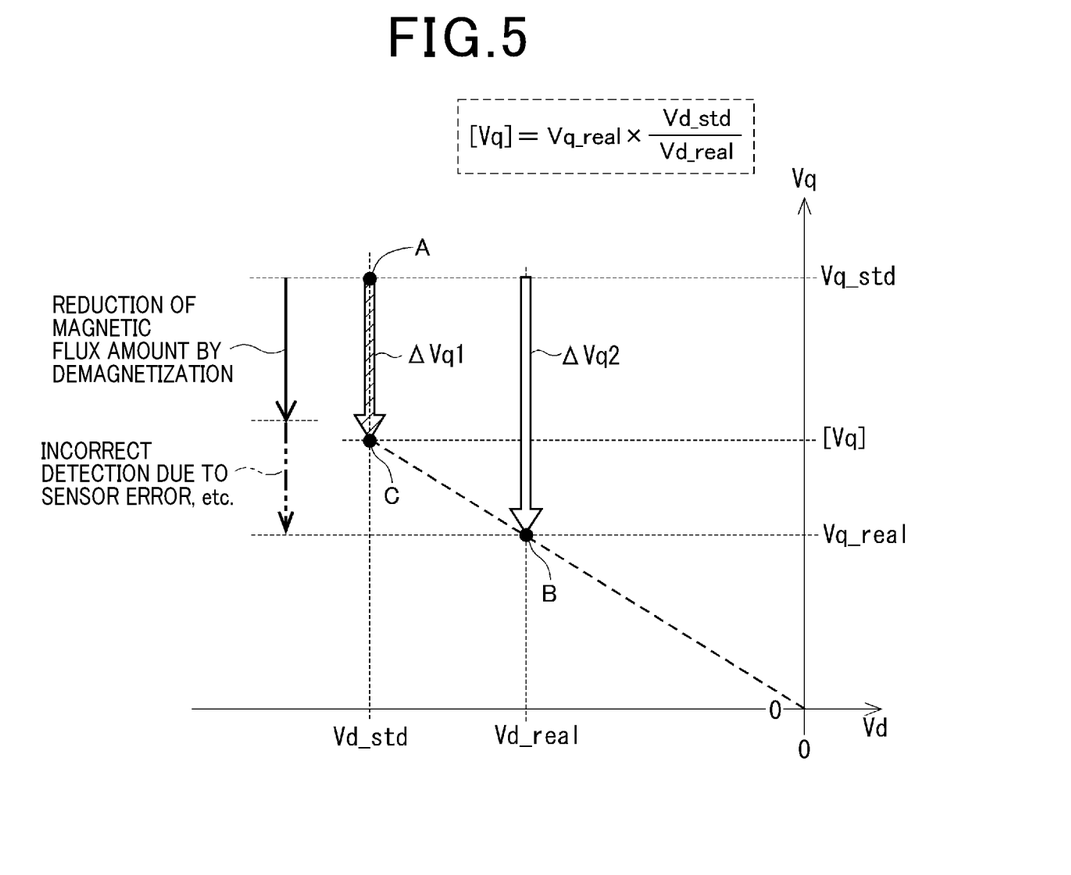
FIG. 5 is a view showing comparison results of the magnetic flux change amount estimation based on a Vd-Vq method and a Vq method performed by the MG control device according to the exemplary embodiment of the present disclosure.

FIG. 5 is a view showing the comparison results of the magnetic flux change amount estimation based on the Vd-Vq method and the Vq method performed by the MG control device 20 according to the exemplary embodiment of the present disclosure.

In the Vd-Vq coordinate system shown in FIG. 5, the reference character A designates an intersection point between the d axis standard voltage Vd_std and the q axis standard voltage Vq_std. A reference character B designates an intersection point between the d axis real voltage Vd_real and the q axis real voltage Vq_real. A reference character C designates an intersection point between the d axis standard voltage Vd_std and the q axis real voltage corrected value [Vq]. The intersection point C is extended from the intersection point B on a straight line between the origin in the Vd-Vq coordinate system and the intersection point B.

The second q axis voltage change amount ΔVq2 obtained by the Vq method corresponds a q axis voltage change amount from the intersection point A to the intersection point B, where the intersection point A and the intersection point B have a different q axis voltage Vd. That is, the second q axis voltage change amount ΔVq2 is an amount obtained by adding a magnetic flux reduction amount caused by demagnetization of the permanent magnets of the MG 80 and an incorrect value caused by a sensor detection error, etc.

On the other hand, the first q axis voltage change amount $\Delta Vq1$ obtained by the Vd-Vq method corresponds to a q axis voltage change amount from the intersection point A to the intersection point C.

Using the first q axis voltage change amount $\Delta Vq1$ reduces the detection inaccuracy, i.e. reduces an amount generated by incorrect detection when compared with using the second q axis voltage change amount $\Delta Vq2$ obtained by the Vq method. Accordingly, the first q axis voltage change amount $\Delta Vq1$ obtained by the Vd-Vq method corresponds with high accuracy to the amount reflected by the magnetic flux reduction amount caused by demagnetization of the permanent magnets of the MG 80.

As previously described, the first magnetic flux change amount estimation value calculation part 33 calculates the first magnetic flux change amount estimation value $\Delta\phi1$ on the basis of Equation (6) of the Vd-Vq method.

In the operation of calculating the q axis real voltage correction value [Vq], the d axis standard voltage Vd_std is divided by the d axis real voltage Vd_real. Accordingly, in the area in which the d axis real voltage Vd_real is approximately equal to zero, there is a possible case in which a small change amount drastically causes a large error in this region, and no effective reduction of the sensor error is obtained. That is, the area in which the d axis real voltage Vd_real is approximately equal to zero corresponds to a low torque area of the MG 80.

In the low torque area, it can be understood that it is not preferable for the first magnetic flux change amount estimation value calculation part 33 to perform the Vd-Vq method. Accordingly, the magnetic flux change amount estimation part 30 in the MG control device 20 according to the exemplary embodiment has the second magnetic flux change amount estimation value calculation part 34 in addition to the first magnetic flux change amount estimation value calculation part 33. The second magnetic flux change amount estimation value calculation part 34 calculates the second magnetic flux change amount estimation value $\Delta\phi2$ based on the deviation of the q axis real voltage Vd_real from the q axis standard voltage Vd_std by using Equation (4) of the Vq method.

The calculation switching part 35 receives the torque instruction value Trq*. It is acceptable for the calculation switching part 35 to receive a torque detection value detected by the torque sensor mounted on the MG 80. It is also acceptable for the calculation switching part 35 to receive the d axis current instruction value Id* and the q axis current instruction value Iq* (or the d axis real current value Id and the q axis real current value Iq) so as to calculate the torque estimation value.

The calculation switching part 35 switches the first magnetic flux change amount estimation value $\Delta\phi1$ and the second magnetic flux change amount estimation value $\Delta\phi2$ as follows. That is, the calculation switching part 35 uses the first magnetic flux change amount estimation value $\Delta\phi1$ when the torque or the current is not less than a predetermined switching threshold value. Further, the calculation switching part 35 uses the second magnetic flux change amount estimation value $\Delta\phi2$ when the torque or the current is less than the predetermined switching threshold value.

In the structure shown in FIG. 4, the first magnetic flux change amount estimation value calculation part 33 and the second magnetic flux change amount estimation value calculation part 34 firstly calculates the first magnetic flux change amount estimation value $\Delta\phi1$ and the second magnetic flux change amount estimation value $\Delta\phi2$, and which one actually does the selection of the calculated values.

However, it is possible for the calculation switching part 35 to determine one of the first magnetic flux change amount estimation value calculation part 33 and the second magnetic flux change amount estimation value calculation part 34. After this, the selected part calculates one of the first magnetic flux change amount estimation value $\Delta\phi1$ and the second magnetic flux change amount estimation value $\Delta\phi2$, The LPF 39 performs the filtering process to filter the calculated magnetic flux change amount estimation value $\Delta\phi$ (i.e. one of the first magnetic flux change amount estimation value $\Delta\phi1$ and the second magnetic flux change amount estimation value $\Delta\phi2$), and transmits the filtered value to the demagnetization detection part 40. This process makes it possible to prevent a rapid change of the magnetic flux change amount estimation value $\Delta\phi$ when the calculation switching part 35 switches the first magnetic flux change amount estimation value $\Delta\phi1$ and the second magnetic flux change amount estimation value $\Delta\phi2$.

A description will be given of the magnetic flux change amount estimation calculation process and the demagnetization detection process with reference to FIG. 6.

Figure 6:
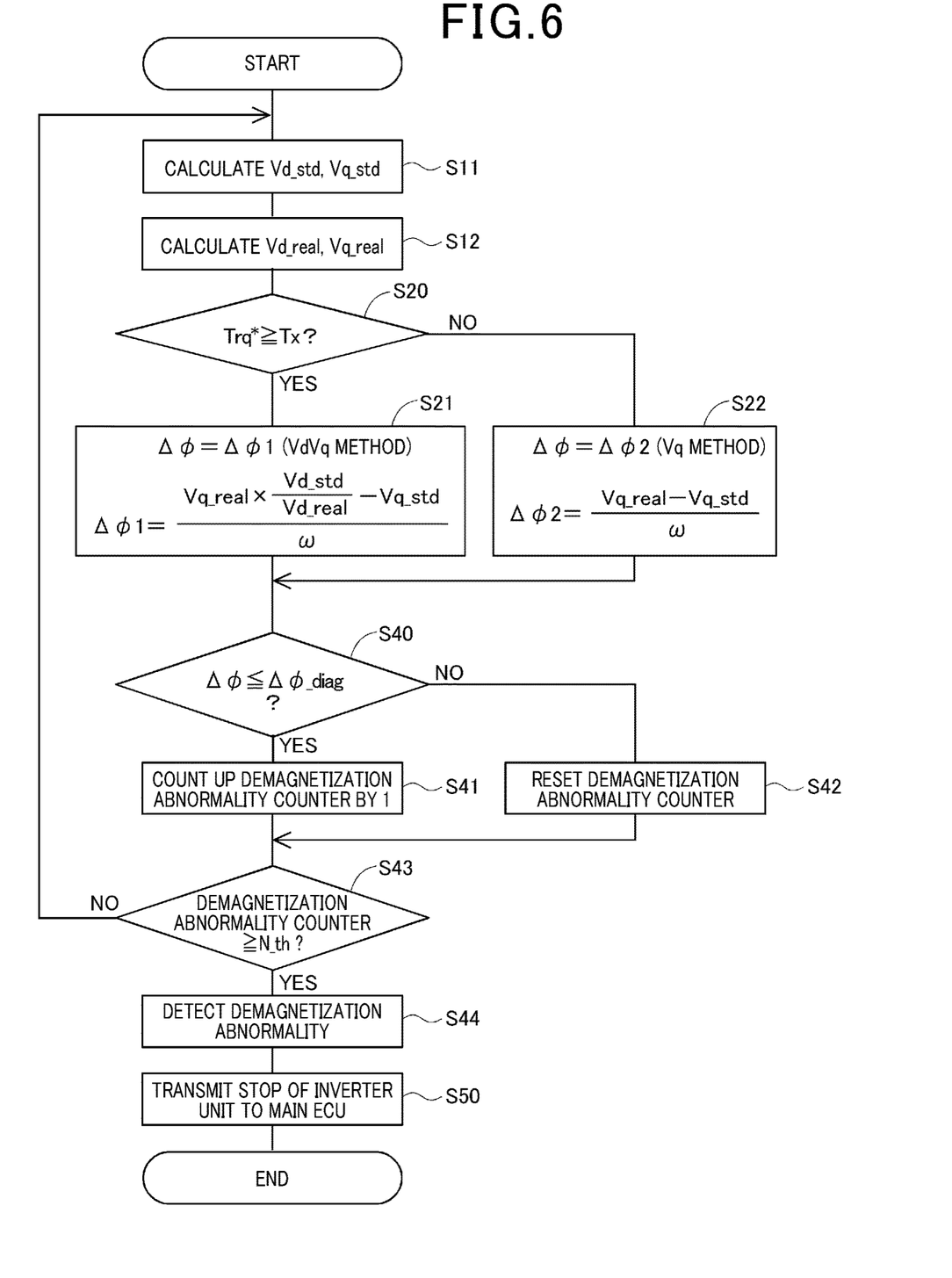
FIG. 6 is a view showing a flow chart of estimating a magnetic flux change amount in a motor generator and of detecting occurrence of demagnetization of permanent magnets in the motor generator performed by the MG control device according to the exemplary embodiment of the present disclosure.

FIG. 6 is a view showing a flow chart of estimating a magnetic flux change amount as the magnetic flux change amount estimation value $\phi$ and of detecting occurrence of demagnetization of the permanent magnets in the MG 80 performed by the MG control device 20 according to the exemplary embodiment of the present disclosure.

In step S11 shown in FIG. 6, the standard voltage calculation part 32 calculates the d axis standard voltage Vd_std and the q axis standard voltage Vq_std by using Equation (1). The operation flow progresses to step S12.

In step S12, the real voltage estimation part 31 calculates the d axis real voltage Vd_real and the q axis real voltage Vq_real, to be supplied to the MG 80, on the basis of the voltage instruction values Vd*, Vq*. The operation flow progresses to step S20.

In step S20, the calculation switching part 35 detects whether the torque instruction value trq* is not less than the torque threshold value Tx. It is acceptable for the calculation switching part 35 to detect whether the detected torque value is not less than the torque threshold value Tx. Because there is a correlation between the torque and the d axis current value, and the q axis current value, it is acceptable for the calculation switching part 35 to determine that the torque instruction value trq* is not less than the torque threshold value Tx when the current flowing in the MG 80 is not less than a predetermined threshold value, and to determine that the torque instruction value trq* is less than the torque threshold value Tx when the current flowing in the MG 80 is less than the predetermined switching threshold value.

When the torque instruction value trq* is not less than the torque threshold value Tx, the detection result in step S20 indicates positive ("YES" in step S20), and the operation flow progresses to step S21.

In step S21, the calculation switching part 35 selects the first magnetic flux change amount estimation value $\Delta\phi1$ calculated by using Equation (6) on the basis of the Vd-Vq method as the magnetic flux change amount estimation value $\Delta\phi$.

On the other hand, when the torque instruction value trq* is less than the torque threshold value Tx, the detection result in step S20 indicates negative ("NO" in step S20), and the operation flow progresses to step S22.

In step S22, the calculation switching part 35 in the magnetic flux change amount estimation part 30 selects the second magnetic flux change amount estimation value $\Delta\phi2$ calculated by using Equation (4) on the basis of the Vq method as the magnetic flux change amount estimation value $\Delta\phi$.

A description will be given of a detailed explanation of the detection process in step S20 performed by the calculation switching part 35 in the magnetic flux change amount estimation part 30 in the MG control device 20 with reference to FIG. 7.

Figure 7:
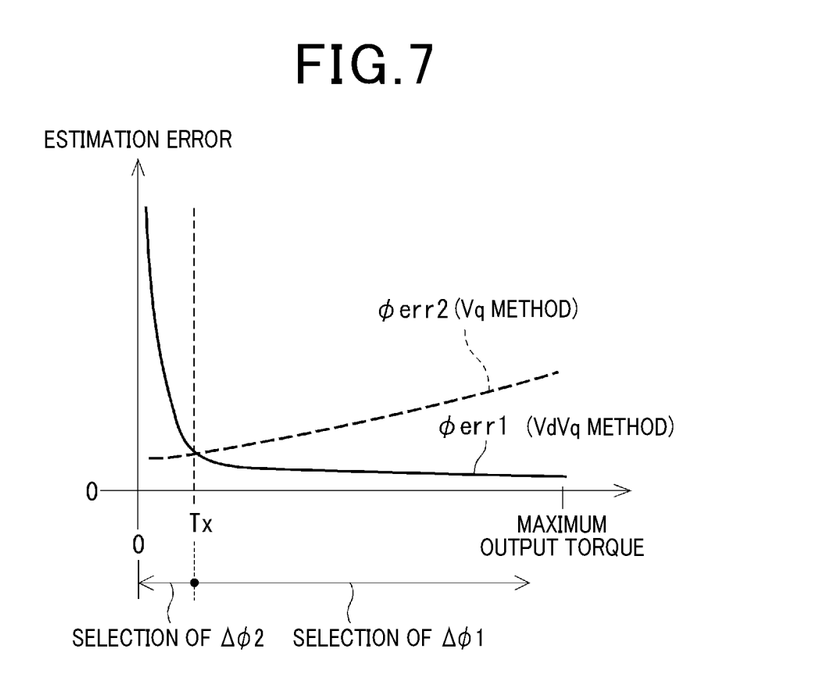
FIG. 7 is a view showing a relationship between an output torque of the motor generator and a magnetic flux change amount estimation value calculated by the Vd-Vq method and the Vq method performed by the magnetic flux estimation amount calculation part in the MG control device according to the exemplary embodiment of the present disclosure shown in FIG. 1.

FIG. 7 is a view showing a relationship between an output torque of the motor generator and a magnetic flux change amount estimation value calculated by the Vd-Vq method and the Vq method performed by the magnetic flux estimation amount calculation part in the MG control device according to the exemplary embodiment of the present disclosure.

As shown in FIG. 7, in the area in which the output torque of the MG 80 is not less than the torque threshold value Tx, the estimation error $\Delta\phi err1$ of the first magnetic flux change amount estimation value $\Delta\phi1$ obtained by the Vd-Vq method is smaller than the estimation error $\Delta\phi err2$ of the second magnetic flux change amount estimation value $\Delta\phi2$ obtained by the Vq method.

Because the d axis real voltage Vd_real in Equation (6) becomes close to zero in the low output torque region of the MG 80, the estimation error $\Delta\phi err1$ of the first magnetic flux change amount estimation value $\Delta\phi1$ obtained by the Vd-Vq method drastically increases. On the other hand, the estimation error $\Delta\phi err2$ of the second magnetic flux change amount estimation value $\Delta\phi2$ obtained by the Vq method is slightly reduced according to the reduction of the output torque of the MG 80.

Accordingly, in the area in which the output torque of the MG 80 is less than the torque threshold value Tx, the estimation error $\Delta\phi err1$ of the first magnetic flux change amount estimation value $\Delta\phi1$ obtained by the Vd-Vq method becomes greater than the estimation error $\Delta\phi err2$ of the second magnetic flux change amount estimation value $\Delta\phi2$ obtained by the Vq method.

The calculation switching part 35 selects the first magnetic flux change amount estimation value $\Delta\phi1$ in the area in which the output torque of the MG 80 is not less than the torque threshold value Tx, and selects the second magnetic flux change amount estimation value $\Delta\phi2$ in the area in which the output torque of the MG 80 is less than the torque threshold value Tx so as to reduce the error of the magnetic flux change amount estimation value $\Delta\phi$ in the overall area, to as small as possible. The calculation switching part 35 transmits the selected magnetic flux change amount estimation value $\Delta\phi$ to the LPF 36 shown in FIG. 4. The operation flow progresses to step S40.

In step S40, when receiving the magnetic flux change amount estimation value $\Delta\phi$ transmitted from the LPF 36 in the magnetic flux change amount estimation part 30, the demagnetization detection part 40 detects whether the magnetic flux change amount estimation value $\Delta\phi$ is not more than the predetermined detection threshold value $\Delta\phi\_diag$.

When the detection result in step S40 indicates positive ("YES" in step S40), i.e. indicates that the magnetic flux change amount estimation value $\Delta\phi$ is not more than the predetermined detection threshold value $\Delta\phi\_diag$, the operation flow progresses to step S41.

In step S41, the MG control device 20 increments the value of a demagnetization abnormality counter by one. The operation flow progresses to step 43.

On the other hand, when the detection result in step S40 indicates negative ("NO" in step S40), i.e. indicates that the magnetic flux change amount estimation value $\Delta\phi$ is more than the predetermined detection threshold value $\Delta\phi\_diag$, the operation flow progresses to step S42.

In step S42, the MG control device 20 resets the value of the demagnetization abnormality counter to zero. The operation flow progresses to step 43.

In step S43, the MG control device 20 detects whether the value of the demagnetization abnormality counter reaches an abnormality detection threshold value N_th.

When the detection result in step S43 indicates negative ("NO" in step S43), i.e. indicates that the value of the demagnetization abnormality counter does not reach the abnormality detection threshold value N_th, the operation flow is returned to step S11. In this case, the demagnetization detection part 40 in the MG control device 20 restarts the calculation process of estimating the magnetic flux change amount value $\Delta\phi$.

On the other hand, when the detection result in step S43 indicates positive ("YES" in step S43), i.e. indicates that the value of the demagnetization abnormality counter has reached the abnormality detection threshold value N_th, the operation flow progresses to step S44.

In step S44, the demagnetization detection part 40 determines the occurrence of demagnetization abnormality of the permanent magnets of the MG 80.

As previously described, the determination of demagnetization abnormality of the permanent magnets in the MG 80 makes it possible to prevent incorrect detection of occurrence of the irreversible demagnetization abnormality due to a temporary reversible demagnetization and estimation error when no irreversible demagnetization has occurred.

However, when the frequency of occurrence of the incorrect detection is low, it is acceptable for the demagnetization detection part 40 to set the abnormality detection threshold value N_th to one so as to quickly detect the occurrence of demagnetization abnormality.

When the occurrence of demagnetization abnormality is detected, the MG control device 20 prohibits the switching operation of the inverter 62, and transmits failure information to the main ECU 50. When receiving the failure information, the main ECU 50 instructs the display device 55, for example the meter ECU, etc. to display the failure information. In addition, when the MG control device 20 according to the exemplary embodiment is mounted on a hybrid vehicle, the main ECU 50 switches to the evacuation travel mode which uses the MG 80.

As previously described, the MG control device 20 according to the exemplary embodiment instructs the first magnetic flux change amount estimation value calculation part 33 (see FIG. 4) to calculate the magnetic flux change amount estimation value $\Delta\phi$ on the basis of information regarding the d axis voltage in addition to the information regarding the q axis voltage when the output torque of the MG 80 (for example, the instruction value Trq*) is not less than the torque threshold value Tx. This makes it possible to increase the estimation accuracy of the magnetic flux change amount value $\Delta\phi$, and to correctly detect the occurrence of demagnetization of the permanent magnets in the MG 80 with high accuracy.

The MG control device 20 according to the exemplary embodiment switches the calculation method of estimating the magnetic flux change amount estimation value $\Delta\phi$ to be used to detect occurrence of demagnetization on the basis of the output torque or the current of the MG 80. This makes it possible to correctly detect the occurrence of demagnetization in the overall region of the output torque and the current of the MG 80. Because there is a possible case in which the calculation results of the magnetic flux change amount estimation values diverge at a low rotation speed of the MG 80 in which the rotation speed w of the MG 80 becomes approximately zero, it is acceptable to stop the magnetic flux change amount estimation part 30 calculating.

Other Modifications (a) In the structure shown in FIG. 4, the LPF 39 performs the filtering process of the magnetic flux change amount estimation value Δϕ transmitted from the calculation switching part 35 to the demagnetization detection part 40. This filtering process prevents a rapid change of the magnetic flux change amount estimation value Δϕ when the estimation calculation is switched.

Figure 8:
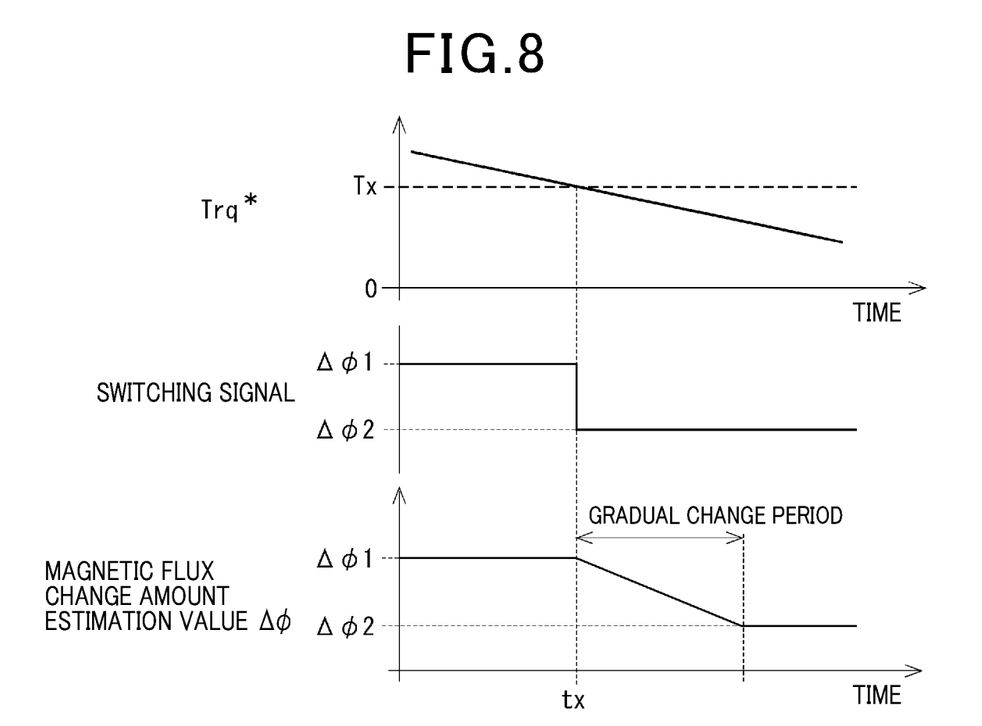
FIG. 8 is a view explaining a gradual change of a magnetic flux change amount estimation value at a calculation switching performed by the MG control device according to the exemplary embodiment of the present disclosure.

FIG. 8 is a view explaining a gradual change of the magnetic flux change amount estimation value Δϕ at the calculation switching performed by the MG control device 20 according to the exemplary embodiment of the present disclosure. As shown in FIG. 8, it is acceptable for the MG control device 20 to slightly change the output of the calculation switching part 35 from the first magnetic flux change amount estimation value Δϕ1 to the second magnetic flux change amount estimation value Δϕ2 during a period counted from a timing tx when the torque instruction Trq* becomes lower than the torque threshold value Tx, and the calculation switching signal (not shown) is transmitted to the calculation switching part 35. This structure and operation makes it possible to prevent a rapid change of the magnetic flux change amount estimation value Δϕ when the calculation switching part 35 performs the estimation calculation switching process.

(b) In the structure of the MG control device 20 according to the exemplary embodiment previously described, the Vd-Vq method and the Vq method are switched according to the magnitude of the output torque or the current of the MG 80, where the first magnetic flux change amount estimation value calculation part 33 calculates the first magnetic flux change amount estimation value Δϕ1 on the basis of the Vd-Vq method, and the second magnetic flux change amount estimation value calculation part 34 calculates second magnetic flux change amount estimation value Δϕ2 on the basis of the Vq method.

However, it is acceptable for the calculation switching part 35 to perform the estimation calculation switching process on the basis of another parameter regarding the operation state of the MG 80 so as to increase the estimation accuracy of the magnetic flux change amount estimation value Δϕ.

(c) In the exemplary embodiment of the present disclosure previously described, the MG control device 20 as the control device for AC motors is applied to hybrid vehicles and electric vehicles. However, the concept of the present disclosure is not limited by this exemplary embodiment. It is possible to apply the MG control device 20 to AC motors equipped with permanent magnets in various fields. It is possible to MG control device 20 according to the exemplary embodiment to poly-phase AC motors in addition to three phase AC motors.

There is a known control device for AC motors. The known control device detects occurrence of demagnetization in the permanent magnets in the AC motor due to the reduction of the output torque of the AC motor caused by irreversible demagnetization, in particular, at a high temperature. Accordingly, it is difficult for the known control device to correctly detect the occurrence of demagnetization of the permanent magnets in the AC motor with high accuracy. For example, there is a motor drive device which detects a d axis standard voltage value on the basis of a current and a rotation speed of the AC motor when no demagnetization has occurred in the AC motor. The motor drive device estimates a demagnetization amount on the basis of a comparison result between the voltage standard value and a real q axis voltage. The motor drive device detects occurrence of demagnetization of the permanent magnets in the AC motor when the real q axis voltage is smaller than the voltage standard value.

A standard magnetic flux amount is determined in a standard state in which no demagnetization has occurred in the permanent magnets of the MG. A magnet flux change amount represents a deviation of a magnet flux amount of the permanent magnets from a standard magnet flux amount in the standard state. In the standard state of the permanent magnets of the MG, the axis standard voltage and the q axis standard voltage are supplied to the MG. The known control device calculates a magnet flux change amount estimation value on the basis of a deviation of the q axis real voltage from the q axis standard voltage.

In particular, the known control device calculates a magnetic flux change amount estimation value by using information of the q axis voltage only, not using information of the d axis voltage in addition to the q axis voltage. Accordingly, the estimated magnetic flux is easily influenced by detection error of a voltage sensor, etc. It is accordingly difficult to correctly detect whether the detected q axis voltage is changed due to demagnetization of the permanent magnets of the MG or due to the sensor detection error. This causes estimation accuracy of the magnetic flux change amount and reduces the demagnetization detection reliability.

The known control device estimates a magnetic flux change amount by using a simple logic regardless of the operation state of the AC motor. This often causes incorrect estimation of the magnetic flux change amount due to an output torque, a current, etc. of the AC motor.

On the other hand, as previously explained and described in detail, the MG control device as the control device for AC motors according to the present disclosure avoids these drawbacks such as occurrence of estimation error. Further, it is possible for the present disclosure to provide a control method of performing a power supply control of an alternating current motor comprising permanent magnets. The control device for alternating current motors as previously described performs the control method of performing the power supply control of an alternating current motor.

The voltage instruction calculation part corresponds to the voltage instruction calculation part 24. The electric power conversion unit corresponds to the inverter unit 62. The magnetic flux change amount estimation part corresponds to the magnetic flux change amount estimation part 30 and the processes in step S11, step S12, step S20, step S21 and step S22. The demagnetization detection part corresponds to the demagnetization detection part 40 and the processes in step S40, step S41, step S42, step S43 and step S43, for example.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A control device for alternating current motors configured to perform a power supply control of an alternating current motor comprising permanent magnets, the control device comprising a computer system including a central processing unit, the computer system being configured to provide:
a voltage instruction calculation part calculating voltage instruction values on the basis of an output torque instruction to be supplied to the alternating current motor;
an electric power conversion unit converting a direct current power to an alternating current power on the basis of the voltage instruction values, and supplying the alternating current power to the alternating current motor;
a magnetic flux change amount estimation part calculating a magnetic flux change amount estimation value which is a deviation of a real magnetic flux amount of the permanent magnets of the alternating current motor from a standard magnetic flux amount, where the standard magnetic flux amount of the permanent magnets is an amount when no demagnetization has occurred in the permanent magnets; and
a demagnetization detection part detecting occurrence of demagnetization of the permanent magnets when the magnetic flux change amount estimation value calculated by the magnetic flux change amount estimation part is lower than a predetermined detection threshold value, wherein
the magnetic flux change amount estimation part comprises:
a real voltage estimation part estimating a d axis real voltage and a q axis real voltage to be supplied to the alternating current motor, or obtaining voltage detection values as the d axis real voltage and the q axis real voltage, correlated with the voltage instruction values;
a standard voltage calculation part calculating a d axis standard voltage and a q axis standard voltage to be supplied to the alternating current motor in a standard state of the alternating current motor on the basis of an electrical angular speed and a current of the alternating current motor;
a first magnetic flux change amount estimation value calculation part calculating a first magnetic flux change amount estimation value on the basis of a deviation of a specific value from the q axis standard voltage, where the specific value is obtained by multiplying a ratio of the d axis standard voltage and the d axis real voltage;
a second magnetic flux change amount estimation value calculation part calculating a second magnetic flux change amount estimation value on the basis of a deviation of the q axis real voltage from the q axis standard voltage; and
a calculation switching part selects, as the magnetic flux change amount estimation value, one of the first magnetic flux change amount estimation value calculated by the first magnetic flux change amount estimation value calculation part and the second magnetic flux change amount estimation value calculated by the second magnetic flux change amount estimation value calculation part on the basis of an operation state of the alternating current motor.

2. The control device for alternating current motors according to claim 1, wherein the calculation switching part selects the first magnetic flux change amount estimation value calculated by the first magnetic flux change amount estimation value calculation part when an output torque or a current of the alternating current motor is not less than the predetermined switching threshold value, and
selects the second magnetic flux change amount estimation value calculated by the second magnetic flux change amount estimation value calculation part when the output torque or the current of the alternating current motor is less than the predetermined switching threshold value.

3. A control method of performing a power supply control of an alternating current motor comprising permanent magnets, comprising steps of:
calculating voltage instruction values on the basis of an output torque instruction to be supplied to the alternating current motor;
converting a direct current power to an alternating current power on the basis of the voltage instruction values,
supplying the alternating current power to the alternating current motor;
estimating a magnetic flux change amount estimation value which is a deviation of a real magnetic flux amount of the permanent magnets of the alternating current motor from a standard magnetic flux amount, where the standard magnetic flux amount of the permanent magnets is an amount when no demagnetization has occurred in the permanent magnets; and
detecting occurrence of demagnetization of the permanent magnets of the alternating current motor when the magnetic flux change amount estimation value is lower than a predetermined detection threshold value,
wherein
the estimation of the magnetic flux change amount of the permanent magnets of the alternating current motor comprises steps of:
estimating a d axis real voltage and a q axis real voltage to be supplied to the alternating current motor, or obtaining voltage detection values as the d axis real voltage and the q axis real voltage, correlated with the voltage instruction values;
calculating a d axis standard voltage and a q axis standard voltage to be supplied to the alternating current motor in a standard state of the alternating current motor on the basis of an electrical angular speed and a current of the alternating current motor;
calculating a first magnetic flux change amount estimation value on the basis of a deviation of a specific value from the q axis standard voltage, where the specific value is obtained by multiplying a ratio of the d axis standard voltage and the d axis real voltage;
calculating a second magnetic flux change amount estimation value on the basis of a deviation of the q axis real voltage from the q axis standard voltage; and
selecting one of the first magnetic flux change amount estimation value and the second magnetic flux change amount estimation value on the basis of an operation state of the alternating current motor.

4. The control method of performing a power supply control of an alternating current motor comprising permanent magnets according to claim 3, wherein
the first magnetic flux change amount estimation value calculated by the first magnetic flux change amount estimation value calculation part is selected when an output torque or a current of the alternating current motor is not less than the predetermined switching threshold value, and the second magnetic flux change amount estimation value is selected when the output torque or the current of the alternating current motor is less than the predetermined switching threshold value.

* * * * *